United States Patent [19]
Kirigaya et al.

[11] Patent Number: 5,325,147
[45] Date of Patent: Jun. 28, 1994

[54] EXPOSURE CONTROL APPARATUS OF A CAMERA

[75] Inventors: Tadayuki Kirigaya; Isamu Hirai; Hideaki Tsuji; Nobuhiko Matsudo, all of Tokyo, Japan

[73] Assignee: Asahi Kogaku Kogyo Kabushiki Kaisha, Tokyo, Japan

[21] Appl. No.: 91,866

[22] Filed: Jul. 15, 1993

[30] Foreign Application Priority Data

Oct. 21, 1992 [JP] Japan .................................. 4-282780
Oct. 21, 1992 [JP] Japan .................................. 4-282781
Oct. 21, 1992 [JP] Japan .................................. 4-282782

[51] Int. Cl.⁵ ........................ G03B 7/16; G03B 15/03; G03B 7/097
[52] U.S. Cl. ................................... 354/421; 354/422
[58] Field of Search ............................. 354/420–423, 354/413, 412

[56] References Cited

U.S. PATENT DOCUMENTS

| | | | |
|---|---|---|---|
| 4,653,893 | 3/1987 | Inoue et al. | 354/443 |
| 4,779,115 | 10/1988 | Fujino et al. | 354/422 X |
| 4,779,117 | 10/1988 | Fujino et al. | 354/422 X |
| 4,806,963 | 2/1989 | Kobayashi et al. | 354/415 |
| 4,833,499 | 5/1989 | Nishida | 354/458 |
| 4,908,651 | 3/1990 | Fujino et al. | 354/434 |
| 5,005,042 | 4/1991 | Sato et al. | 354/420 |
| 5,051,769 | 9/1991 | Hayashi et al. | 354/419 |
| 5,220,364 | 6/1993 | Kobayashi et al. | 354/21 |

FOREIGN PATENT DOCUMENTS

| | | |
|---|---|---|
| 2658318 | 8/1991 | France . |
| 62-168123 | 7/1987 | Japan . |
| 3198034 | 8/1991 | Japan . |
| 1527084 | 10/1978 | United Kingdom . |
| 8603602 | 6/1986 | World Int. Prop. O. . |

OTHER PUBLICATIONS

Preliminary Search Report and Annex, Dec. 1, 1993.
Patent Abstracts of Japan, vol. 15, No. 466 (P-1280), Nov. 26, 1991.
United Kingdom Search Report, Aug. 1993.

*Primary Examiner*—W. B. Perkey
*Attorney, Agent, or Firm*—Sandler Greenblum & Bernstein

[57] ABSTRACT

An exposure control apparatus of a camera having a photometer, a film sensitivity detector, a calculator which calculates an exposure value, a diaphragm value and a shutter speed in accordance with a measurement by the photometer and the film sensitivity, an object distance detector, a strobe, a limit diaphragm value calculator that calculates a first limit diaphragm value, which varies with the film sensitivity, and a second limit diaphragm value, which varies with the object distance, when strobe light is emitted, and a minimum limit diaphragm value setting device which compares the first and second limit diaphragm values and selects the larger diaphragm value as the minimum limit diaphragm value to be used in the exposure control.

17 Claims, 14 Drawing Sheets

EXPOSURE CONTROL APPARATUS OF A CAMERA

BACKGROUND OF THE INVENTION

1. Field of the Invention

The present invention relates to an exposure control apparatus of a camera in which an exposure can be controlled when a strobe (i.e., electronic flash) is used. In particular, the invention relates to a minimum diaphragm value which can be set in accordance with film sensitivity data and object distance data. More precisely, the present invention relates to an exposure control apparatus in which a program shift can be carried out in a program exposure mode when the strobe is used.

2. Description of Related Art

An exposure control apparatus is known which has a program shifting function in which, in the program exposure mode, a combination of the shutter speed and the diaphragm value can be varied without changing the exposure value. In the program shift operation, the shutter speed Tv and the diaphragm value Av are first obtained, and then, the obtained values are shifted by a predetermined amount. For example, the program shift is performed in accordance with the following equation:

$$Ev = (Av + \text{"shift"}) + (Tv - \text{"shift"})$$

Upon taking a photograph with a strobe, the shutter speed has an upper limit defined by a strobe synchronization speed, and a lower limit defined by a camera-shake limit speed which prevents the occurrence of camera-shake. In practice, a minimum limit diaphragm value is set at a value slightly greater than the minimum diaphragm value (on an open aperture side) and a maximum limit diaphragm value is set at a value slightly less than the maximum diaphragm value (on a stop-down side), in view of the photographability of the associated camera and the photographable object distance thereof, etc. Consequently, when the strobe is used in the program exposure mode, in which a relationship between the shutter speed and the diaphragm value is programmed in advance, the ranges within which the shutter speed and diaphragm values can be set are restricted.

If the calculated exposure value is below a lower limit value which is defined by the camera-shake limit shutter speed and below the minimum limit diaphragm value, the shutter speed and the diaphragm value are set at the camera-shake limit shutter speed and the minimum limit diaphragm value, respectively. If the calculated exposure value is above an upper limit value which is defined by the strobe synchronization limit speed and above the maximum limit diaphragm value, the shutter speed and the diaphragm value are set at the strobe synchronization limit speed and the maximum limit diaphragm value, respectively. Consequently, a program shift cannot be carried out for a bright object (i.e., high luminance) or a dark object (i.e., low luminance).

Furthermore, in the conventional strobe program, the diaphragm (i.e., stop) is controlled in such a manner that, when a film having a high sensitivity is used, the diaphragm is stopped-down by steps corresponding to the increment of film sensitivity, to thereby make it possible to take a picture using the strobe at an optimum exposure value within a predetermined object distance, irrespective of the film sensitivity. Consequently, even if a film of high sensitivity is used, the object distance range in which a picture can be appropriately taken using the strobe cannot be extended.

If an object at a close distance is taken using the strobe, a large quantity of light emitted by the strobe is reflected by the object. Accordingly, stopping of the emission of strobe light based on the TTL direct metering is delayed, resulting in a tendency of over-exposure.

SUMMARY OF THE INVENTION

The primary object of the present invention is to provide an exposure control apparatus in which when a high sensitivity film is used during strobe photographing, not only the appropriate strobe-photographable object distance (i.e., distance at which a picture can be effectively taken using a strobe) can be extended, but also strobe photographing can be correctly effected at a close object distance without over-exposure.

Another object of the present invention is to provide a strobe program shift exposure control apparatus in which a combination of a shutter speed and a diaphragm value can be shifted within a controllable range defined by a strobe synchronization limit speed, a low shutter speed and a maximum diaphragm value during strobe photographing.

Still another object of the present invention is to provide a strobe program shift exposure control apparatus in which a program shift can be carried out even when a bright or dark object is photographed using a strobe.

According to the present invention, there is provided an exposure control apparatus including a photometering means, a film sensitivity setting means, means for calculating an exposure value, a diaphragm value and a shutter speed in accordance with the measurement made by the photometering means and the film sensitivity set by the film sensitivity setting means, an object distance detecting means, and a strobe light emitting means, comprising a limit diaphragm value calculating means for calculating a first limit diaphragm value AvMINLMT corresponding to the film sensitivity and a second limit diaphragm value AvMINLMT2 corresponding to the object distance detected by the object distance detecting means when strobe light is emitted from the strobe light emitting means, and a minimum limit diaphragm value setting means for comparing the first and second limit diaphragm values AvMINLMT and AvMINLMT2 to select the larger diaphragm value as the minimum limit diaphragm value for use in the exposure control.

According to another aspect of the present invention, there is provided an exposure control apparatus including a photometering means, means for calculating an exposure value, a diaphragm value and a shutter speed in accordance with the measurement made by the photometering means, and a strobe light emitting means, comprising a strobe program mode in which the shutter speed is set within a range defined by a strobe synchronization limit speed TvMAX and a minimum limit shutter speed TvMINMLT less than the strobe synchronization limit speed TvMAX, in accordance with the exposure value when strobe light is emitted from the strobe light emitting means, the diaphragm value being set within a range defined by a minimum limit diaphragm value AvMINLMT that is greater than a minimum diaphragm value AvMIN of an associated taking lens and a maximum limit diaphragm value Av- MAXLMT that is less than a maximum diaphragm value AvMAX of the taking lens, and a program shift means for varying the shutter speed and the diaphragm value within respective ranges defined by the minimum shutter speed TvMIN and the strobe synchronization limit speed TvMAX, and the minimum diaphragm value AvMIN and the maximum diaphragm value AvMAX, without changing the exposure value calculated by the calculating means, in the strobe program mode, when the calculated exposure value is above a lower limit exposure value Ev1 which is determined by the minimum limit diaphragm value AvMINLMT and the strobe synchronization limit speed TvMAX and below an upper limit exposure value Ev3 which is determined by the maximum limit diaphragm value AvMAXLMT and the strobe synchronization limit speed TvMAX, respectively.

According to still another aspect of the present invention, an exposure control apparatus of a camera including a photometering means, means for calculating an exposure value, a diaphragm value and a shutter speed in accordance with the measurement made by the photometering means, a strobe light emitting means, and strobe program mode, comprises a means for replacing the exposure value calculated by the calculating means with a lower limit exposure value Ev1 which is determined by a minimum limit diaphragm value AvMINLMT that is greater than a minimum diaphragm value AvMIN of an associated taking lens, and a minimum limit shutter speed TvMINLMT that is less than a strobe synchronization limit speed TvMAX, in the strobe program mode, when the calculated exposure value is less than the lower limit exposure value Ev1. The exposure control apparatus further comprises a program shift means for varying the shutter speed and the diaphragm value, while retaining the lower limit exposure value Ev1 in the strobe program mode, when the replacing means replaces the calculated exposure value with the lower limit exposure value Ev1.

According to yet another aspect of the present invention, there is provided an exposure control apparatus including photometering a means, means for calculating an exposure value in accordance with a measurement by the photometering means, and a strobe program mode, comprising means for replacing the exposure value calculated by the calculating means with an upper limit exposure value Ev3 which is determined by a maximum limit diaphragm value AvMAXLMT that is less than a maximum diaphragm value AvMAX of an associated taking lens and a strobe synchronization limit speed TvMAX, in the strobe program mode, when the calculated exposure value is greater than the upper limit exposure value Ev3, and a program shift means for varying a shutter speed and a diaphragm value, while maintaining the upper limit exposure value Ev3 in the strobe program mode.

The present disclosure relates to subject matter contained in Japanese patent application Nos. HEI 4282780, HEI 4282781, and HEI 4282782 (all filed on Oct. 21, 1992) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
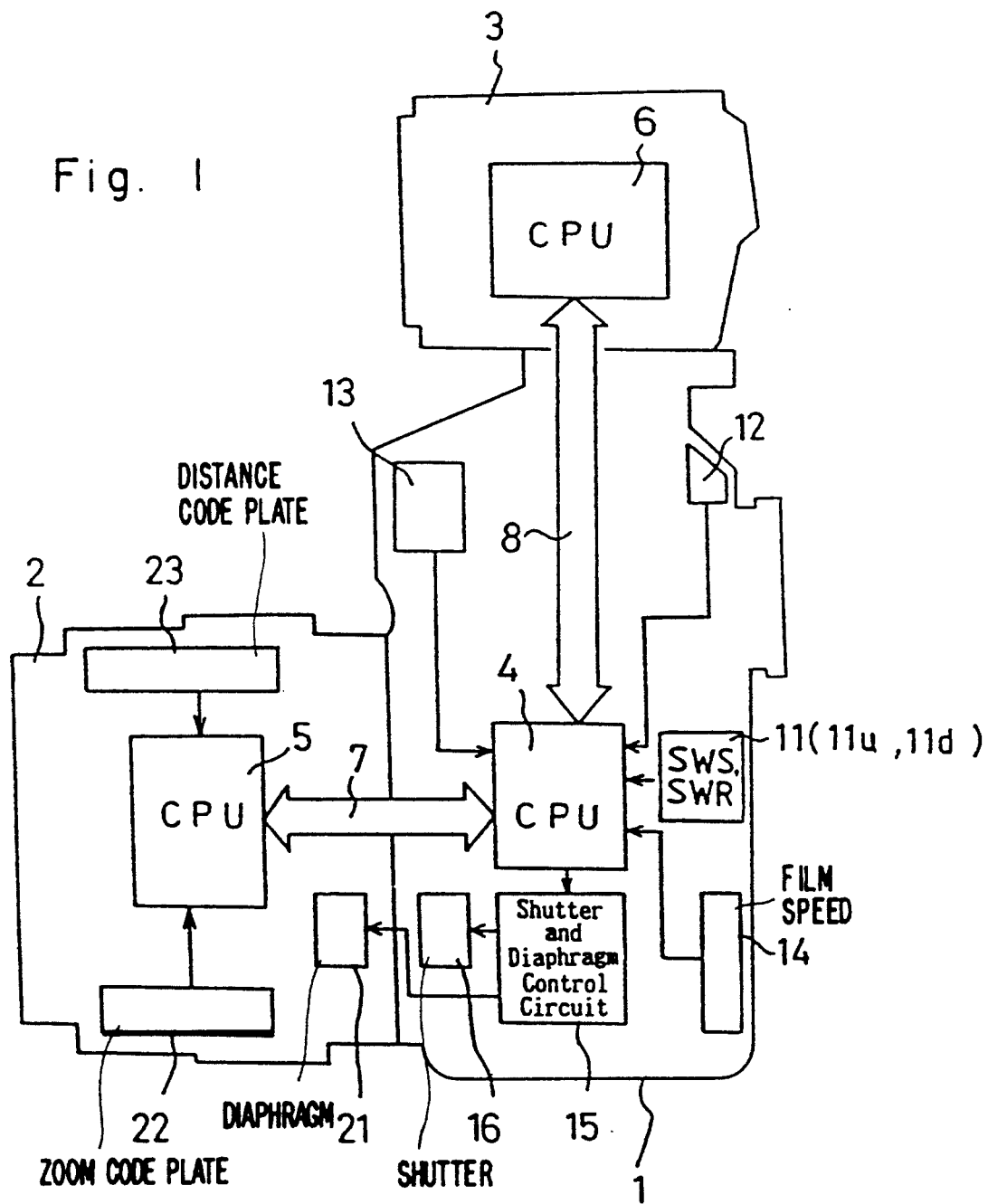
FIG. 1 is a block diagram of a single lens reflex camera having a strobe program exposure control apparatus incorporated therein, according to an embodiment of the present invention.
Figure 2:
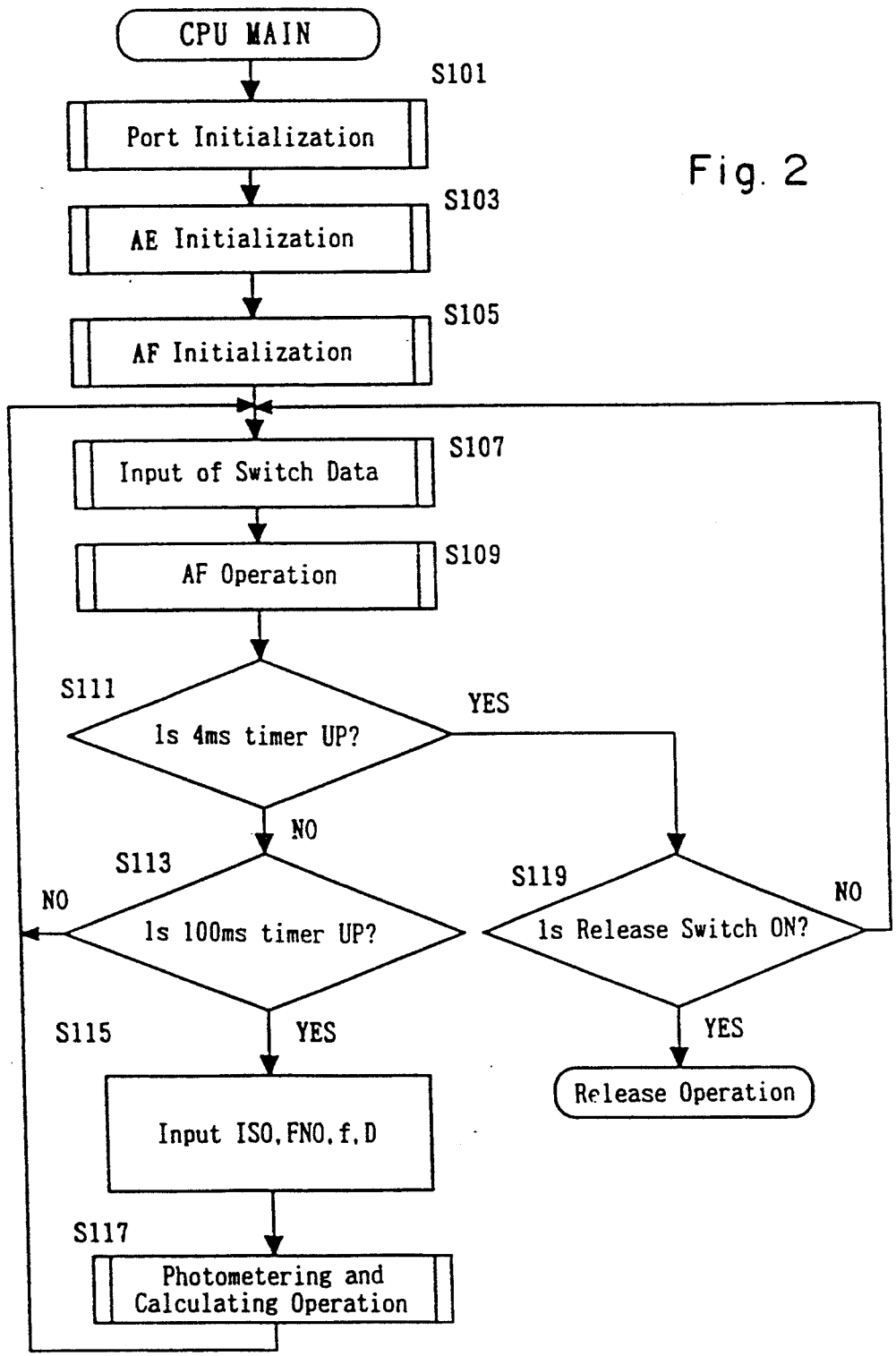
FIG. 2 is a flow chart of a main operation of a CPU in the single lens reflex camera shown in FIG. 1.

FIG. 1 shows the main components of a single lens reflex camera having a strobe exposure control apparatus incorporated therein, in which according to the present invention, a camera body 1 has a zoom lens 2 attached thereto and an external strobe 3 which can be attached to the camera body 1. The camera body 1, the zoom lens 2, and the external strobe 3 are provided therein with a main CPU 4, a lens CPU 5, and a strobe CPU 6, respectively. The main CPU 4 is connected to the lens CPU 5 and the strobe CPU 6 by respective bus lines 7 and 8 through respective connectors (not shown) to transmit and receive necessary data to and from the lens CPU 5 and the strobe CPU 6.

The camera body 1 is provided with a switch assembly 11 including a main switch which is actuated to turn the power source ON and OFF, a photometering switch SWS, a release switch SWR, various function switches for setting the ISO sensitivity and selecting an exposure mode from among a manual exposure mode, a program mode, a shutter-priority mode, and an aperture-priority mode, a strobe emission mode selecting switch, and programing switches including an up-switch 11u and a down-switch 11d, etc. The ON/OFF state of these switches is checked by the main CPU 4.

The camera body 1 is provided therein with a photometering circuit 12 for metering an object brightness, a strobe synchronization circuit 13 which effects the TTL direct metering of the object light after commencement of exposure (i.e., emission of strobe light) to control the emission of strobe light, and a DX-code reading circuit 14 which reads DX-code data representing the ISO sensitivity of the film loaded in the camera. The output signals of these circuits are sent to the main CPU 4.

The camera body 1 is also provided therein with a shutter/diaphragm control circuit 15 which controls and drives a shutter device 16 and a diaphragm device 21 of the zoom lens 2.

The zoom lens 2 is provided with a zoom code plate 22 which is adapted to detect the current focal length and a distance code plate 23 which is adapted to detect the object distance at which a focus lens (not shown) is focused. The lens CPU 5 reads the current focal length data and the current object distance data through the code plates 22 and 23. The lens CPU 5 has an internal ROM in which lens data, such as a maximum diaphragm value Avmax and a minimum diaphragm value Avmin (i.e., open F number) is stored.

The strobe CPU 6 has an internal ROM which stores various strobe data including guide number data GNO, illumination angle data, etc. The strobe CPU 6 outputs the strobe data to the main CPU 4 and receives strobe emission control signals, such as strobe emission preparation signals, light emission signals, or emission stop signals, etc., from the main CPU 4.

The single lens reflex camera has a strobe program and a program shift function, both being activated in a strobe mode in which strobe light is emitted, in addition to regular photographing functions. The strobe program weights the film sensitivity at a value above 0 and below 1. Namely, the strobe program makes it possible to make the best use of a high sensitivity film; that is, to expose an image of an object, located at a far object distance, at an optimum exposure value, by reducing a stop-down amount For an object at a close object distance, the stop-down is effected corresponding to the object distance, so that strobe photographing at an optimum exposure value can be achieved.

In the single lens reflex camera according to the present invention, a program shift can be carried out when strobe photographing to expand the ranges of a shutter speed Tv and diaphragm value Av can be set.

The photographing operation of the single lens reflex camera according to the present invention will be discussed below with reference to FIGS. 2 through 12C.

The photographing operation is generically controlled by the main CPU 4 in accordance with a program stored in the ROM of the main CPU 4.

The definitions of the symbols referred to in the following discussion and the flow charts shown in FIGS. 2 through 11 are as follows. The values of these symbols are all indicated by the apex values.

Lv ... exposure value (i.e., correctly adjusted exposure value Ev );

AvMIN ... minimum diaphragm value (i.e., open aperture of the zoom lens 2: open F number);

AvMAX ... maximum diaphragm value (i.e., minimum diaphragm value of the zoom lens 2: maximum F number);

TvMIN ... minimum shutter speed (i.e., minimum shutter speed which can be controlled by the camera body 1 and which corresponds to a camera-shake limit shutter speed Tvf in the strobe photographing mode);

TvMAx ... maximum shutter speed (maximum shutter speed which can be controlled by the camera body 1 and which corresponds to the strobe synchronization limit speed in the strobe photographing mode);

AvMINLMT ... minimum limit diaphragm value ( first minimum limit diaphragm value which corresponds to a fixed limit value on the open aperture side in the strobe photographing mode );

AvMINLMT2 ... second minimum limit diaphragm value which corresponds to a limit value on the open aperture side at the close strobe photographing mode;

AvMAXLMT ... maximum limit diaphragm value ( limit diaphragm value on the stopped-down side in the strobe photographing mode );

TvMINLMT ... minimum limit shutter speed ( limit value on the low shutter speed side in the strobe photographing mode );

fv ... focal length ( i.e., apex value of the focal length f (mm) of the zoom lens 2), $fv = \log f/\log 2$;

Dv ... object distance (i.e., apex value of the object distance D (m)), $Dv = \log(D)^2/\log 2$;

Tvf ... camera-shake limit shutter speed ( i.e., value corresponding to the focal length f of the zoom lens 2), $Tvf = (\frac{1}{2}) \times fv + 2$;

CPU-MAIN Operation:

The main flow chart of the single lens reflex camera, represented by CPU-MAIN, is simplified in FIGS. 2 through 11 and will be discussed below.

The CPU-MAIN operation starts when the main switch is turned ON. In the CPU-MAIN operation, the initialization of each port of the CPU 4 and the initialization of the RAM for the photographing operation, automatic exposure (AE) and automatic focusing (AF) operation are first carried out (steps S101 to S105). Thereafter intermittent operations are performed in accordance with a 100 ms timer and a 4 ms timer.

Figure 4:
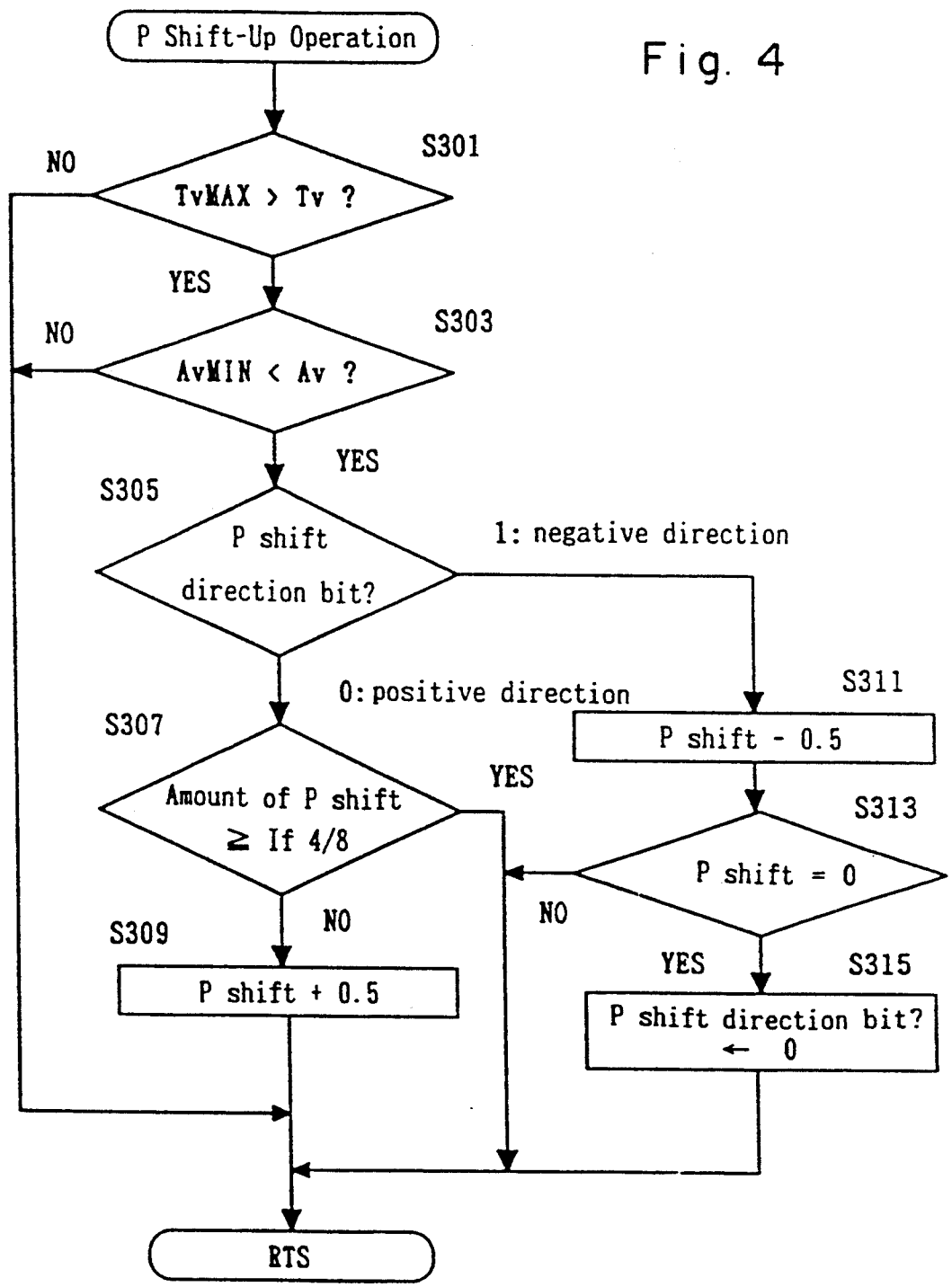
FIG. 4 is a flow chart of a program shift-up operation in the single lens reflex camera shown in FIG. 1.
Figure 5:
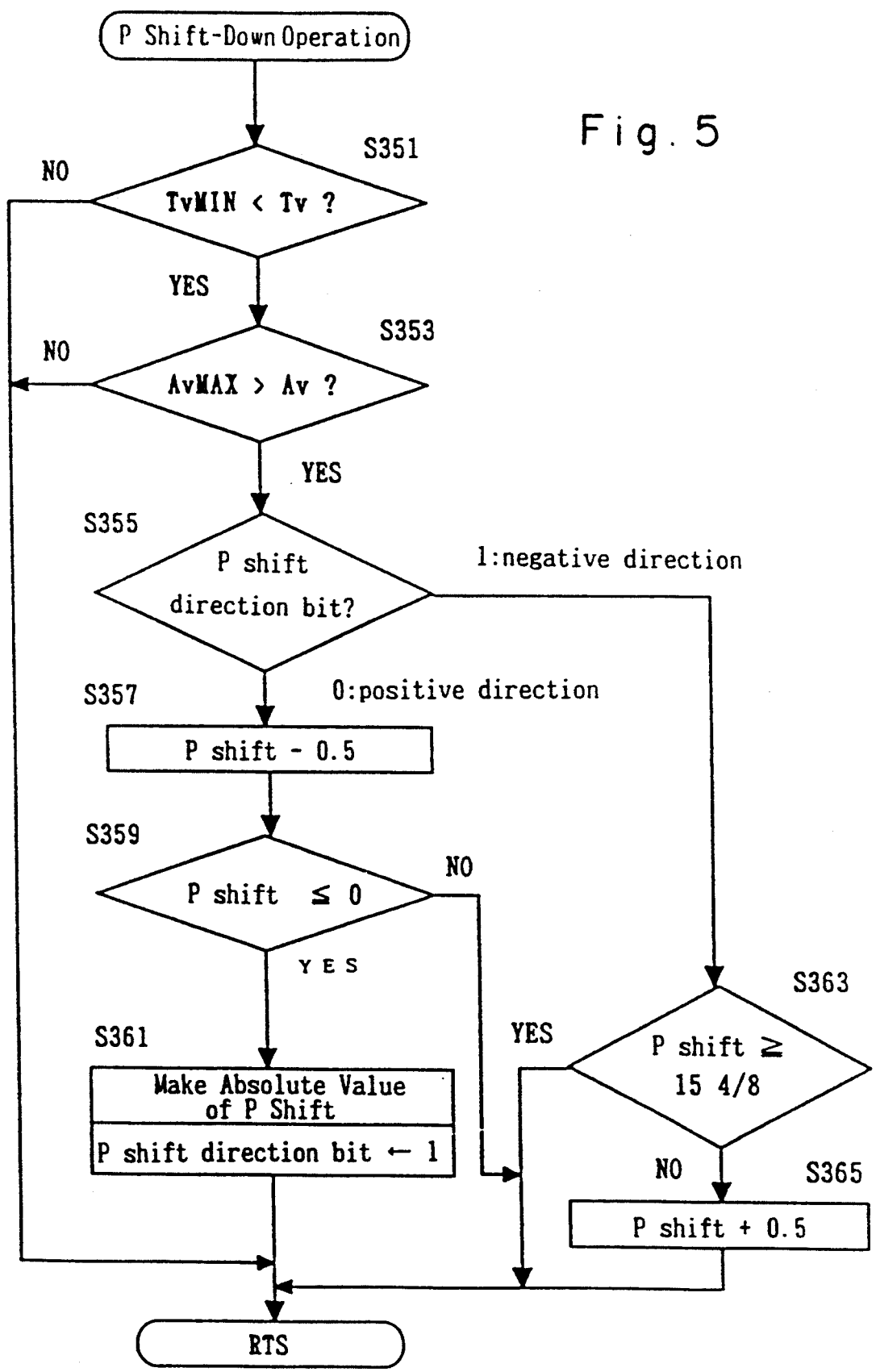
FIG. 5 is a flow chart of a program shift-down operation in the single lens reflex camera shown in FIG. 1.

In the intermittent operations, the ON/OFF states of the switches, including the up-switch 11u and down-switch 11d are input, so that the CPU 4 performs the necessary operations corresponding to the switches which are turned ON (steps S107). In the illustrated flow chart, only the program shift operation is shown. If the up-switch 11u and the down-switch 11d are turned ON, the program shift-up and program shift-down operations are carried out, as shown in FIGS. 4 and 5, respectively provided that the program exposure mode and the strobe program exposure mode are selected, respectively.

If neither the up-switch 11u nor the down-switch 11d are turned ON, or if the necessary operations corresponding to the switches that are actuated are completed, the automatic focus adjusting operation, which is per se known, is carried out to move a focus lens group of a zoom lens 2 to the focal position (step S109).

Whether the 4 ms timer is up is checked at step S111. If the set time is up, control proceeds to step S119 to check whether the release switch SWR is turned ON. If the release switch SWR is turned ON, a release operation is carried out (not shown). Conversely, if release switch SWR is not turned ON, control is returned to step S107.

Figure 3:
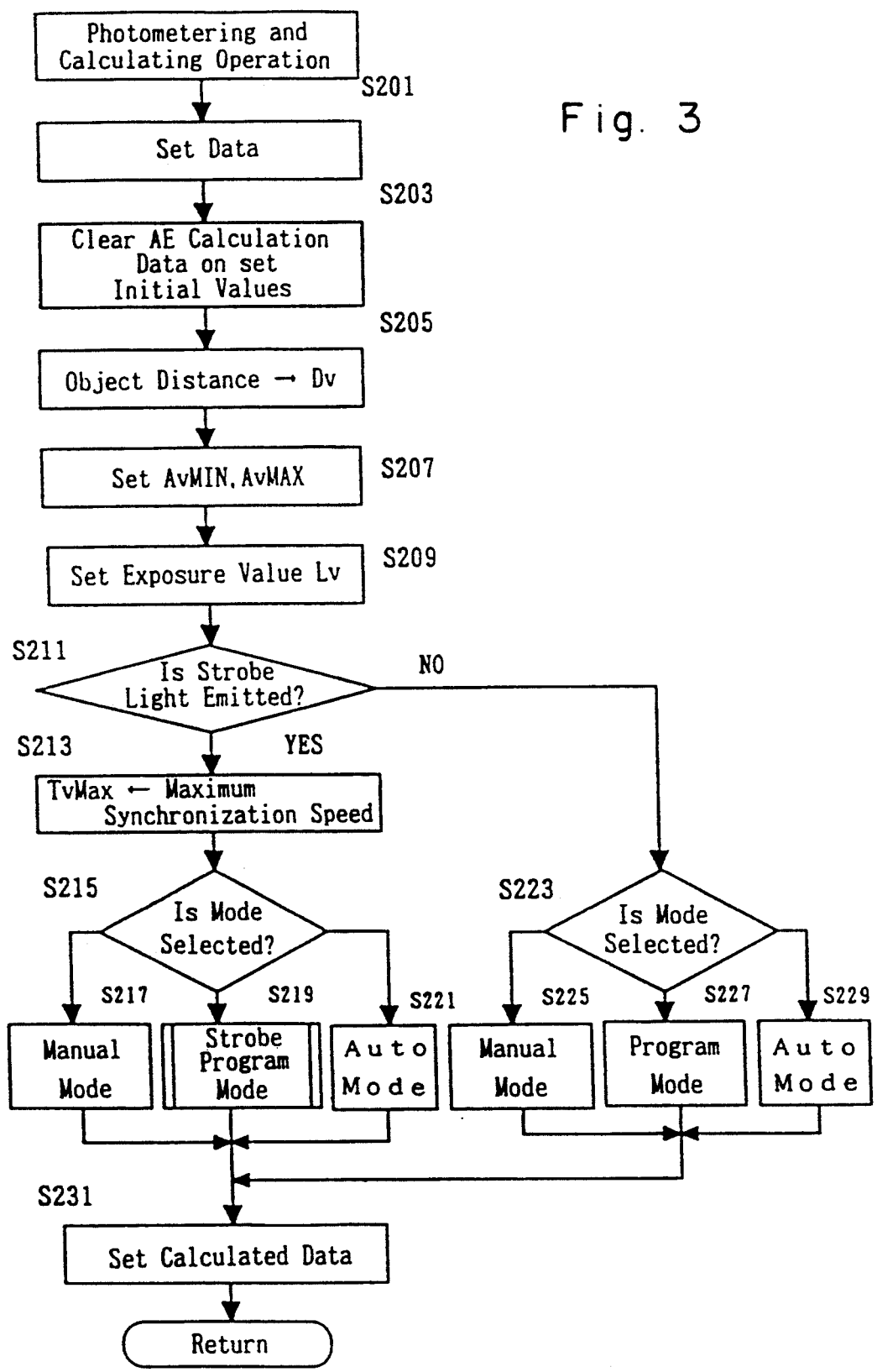
FIG. 3 is a flow chart of photometering and calculating operation in the single lens reflex camera shown in FIG. 1.

If the 4 ms timer is not up at step S111, control proceeds to step S113 to check whether the 100 ms timer is up. If the 100 ms timer is not up, control is returned to step S107. Conversely, if the 100 ms timer is up, control proceeds to step S115 to input the necessary lens data and the strobe data from the lens CPU 5 and the strobe CPU 6, respectively. Thereafter, a photometering and calculating sub-routine, shown in FIG. 3, is called to effect the necessary exposure operations at step S117. Thereafter, control is returned to step S107 to repeat the necessary operations discussed above.

Photometering and Calculating Operation:

The sub-routine for the photometering and calculating operation, called at step S117, will be discussed below with reference to a flow chart shown in FIG. 3.

The brightness of the object is metered and the brightness data is set at a predetermined address (step S201). Thereafter, the data of the AE operation is cleared and an initial value is set (step S203). After that, an object distance D input from the lens CPU 5 is replaced with an object distance value Dv (step S205), and data, such as the minimum diaphragm value AvMIN and the maximum diaphragm value AvMAX, necessary to calculate an exposure factor, are set at Step S207. Thereafter, the calculation of an exposure value Lv is carried out at step S209.

Whether strobe light is emitted is checked at step S211. If strobe light is not emitted, control proceeds to step S223 to call sub-routines (not shown) corresponding to a selected exposure mode (steps S225, S227 and S229). Thereafter, shutter speed Tv and diaphragm value Av for controlling the exposure are calculated and set (step S231).

If strobe light is emitted at step S211 (strobe photographing mode), control proceeds to step S213 to replace the maximum shutter speed TvMAX and the minimum limit shutter speed TvMINLMT with the strobe synchronization speed and a predetermined value, respectively.

Thereafter, the exposure sub-routines corresponding to the selected exposure modes are called and the shutter speed Tv and the diaphragm value Av for controlling the exposure are calculated and set as control values (steps S215 through S231). If the program exposure mode is selected, the sub-routine for a strobe program operation (FIG. 6) is called (steps S215 and S219).

If control is returned from the exposure sub-routines, data, including the shutter speed Tv and the diaphragm value Av, etc., calculated in the respective exposure sub-routines is set. Thereafter, control is returned to the main routine.

In the illustrated embodiment, although the camera-shake limit shutter speed Tvf is set as the minimum limit shutter speed TvMINLMT, another value can be set as the minimum limit shutter speed TvMINLMT. If the camera-shake limit shutter speed Tvf is above the strobe synchronization speed, the maximum shutter speed TvMAX, the minimum limit shutter speed, and the minimum limit shutter speed TvMINLMT are all identical to the strobe synchronization speed.

Program Shift-Up and Shift-Down Operation:

FIGS. 4 and 5 show flow charts of the program shift-up and shift-down operations for effecting the program shift setting operation. In the illustrated embodiment, the amount of shift is set with reference to the shutter speed Tv. Namely, a shift of "+1 (increment)" refers to an addition of 1 Tv to the shutter speed Tv, and a shift of "−1 (decrement)" refers to a subtraction of 1 Tv from the shutter speed Tv. Shift is represented by an absolute value whose magnitude is the value of the program (P) shift. Whether the shift is an increment or decrement is determined by a program (P) shift direction bit.

If the up-switch 11u is turned ON at step S107, control enters the P shift-up operation. If the down-switch 11d is turned ON, control enters the P shift-down operation, respectively.

In the P shift-up operation, when the control diaphragm speed Tv is lower than the maximum shutter speed TvMAX (step S301) and the control diaphragm value Av is greater than the minimum diaphragm value AvMIN (step S303), control proceeds to step S305 to perform the shift-up operation. Conversely, if the control diaphragm speed Tv is not lower than the maximum shutter speed TvMAX (step S301) or if the control diaphragm value Av is not greater than the minimum diaphragm value AvMIN, control is returned since, if the shift-up operation is effected (i.e., the shift value is increased), the shutter speed Tv or the diaphragm value Av would become a value which cannot be controlled.

The direction of the shift is checked by the P shift direction bit at step S305. If the P shift direction bit (flag) is "0" (positive direction), the P shift value is increased by 0.5 Tv increments until the P shift value reaches a maximum value of 15 4/8 Tv (steps S305 to S309). Thereafter, control is returned.

Conversely, if the P shift direction bit (flag) is "1" (negative direction), the P shift value is decreased by 0.5 Tv decrements until the P shift value becomes 0. If the P shift value becomes 0, the P shift direction bit is set at "0". Thereafter, control is returned (steps S305, S311 to S315).

In the P shift-down operation, when the calculated diaphragm speed Tv is higher than the minimum shutter speed TvMIN (step S351) and the calculated diaphragm value Av is smaller than the maximum diaphragm value AvMAX (step S353), control proceeds to step S355 to perform the shift-down operation. Conversely, if the calculated diaphragm speed Tv is not higher than the minimum shutter speed TvMIN or the calculated diaphragm value Av is not less than the maximum diaphragm value AvMAX, control is returned since, if the shift-down operation is effected (i.e., the shift value is decreased), the shutter speed Tv or the diaphragm value Av would become a value which cannot be controlled.

The direction of the shift is checked by the P shift direction bit at step S355. If the P shift direction bit (flag) is "1" (negative direction), the P shift value is increased by 0.5 Tv increments until the P shift value reaches the maximum value of 15 4/8 Tv (steps S355, S363, S365). Thereafter, control is returned.

Conversely, if the P shift direction bit (flag) is "0" (positive direction), the P shift value is stepwise decreased by 0.5 Tv decrement a until the P shift value becomes 0. If the P shift value becomes 0, the P shift direction bit (flag) is set at "1". Thereafter, control is returned (steps S355, S357 to S361).

Figure 9:
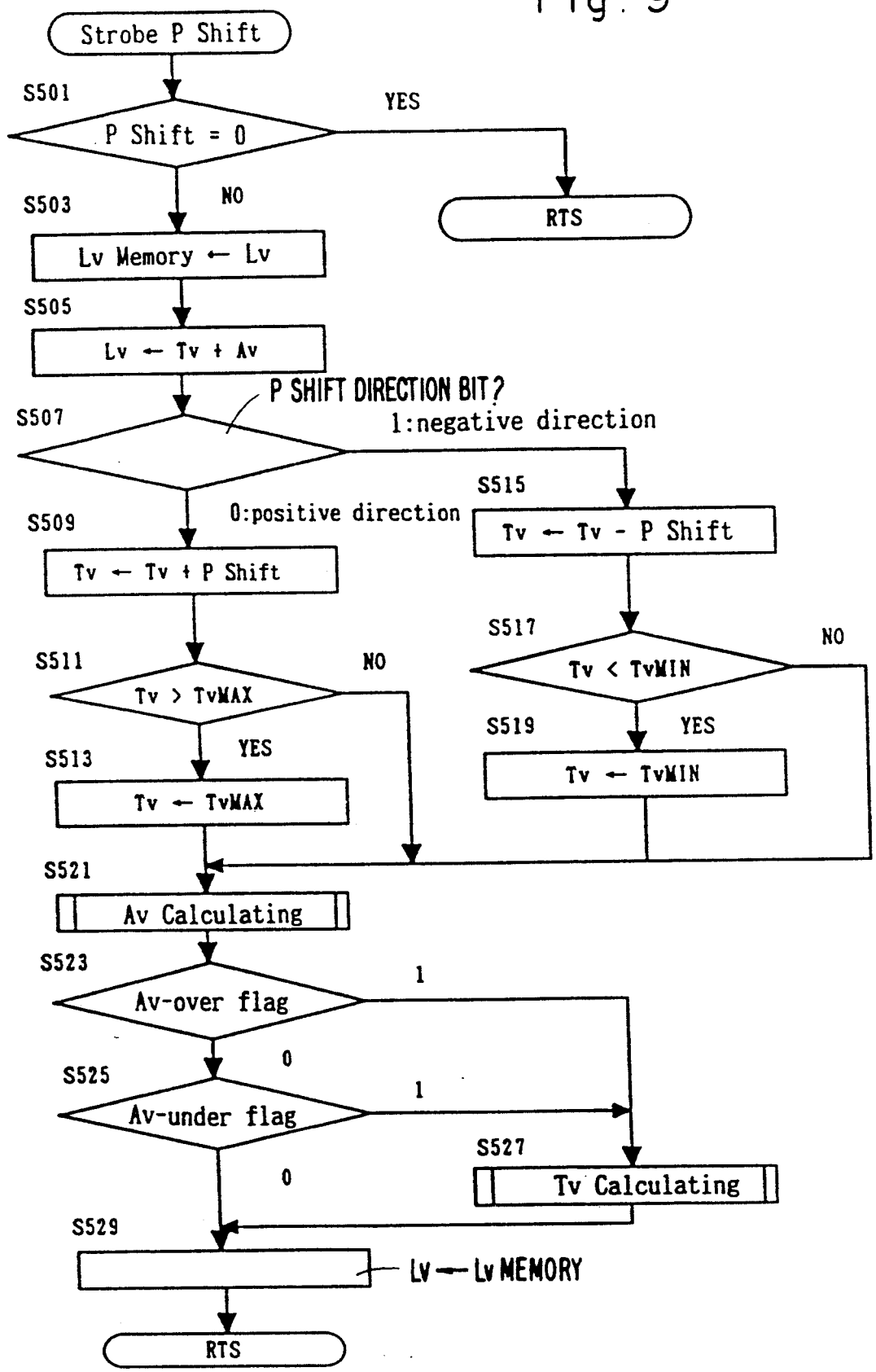
FIG. 9 is a flow chart of a program shift operation in a strobe program in the single lens reflex camera shown in FIG. 1.

The program shift value and the program shift direction bit set in the above mentioned operations are used in the strobe program shift operation, shown in FIG. 9. Note that the unit increment or decrement is not limited to 0 5 Tv and can be a value more or less than 0.5 Tv.

Figure 6:
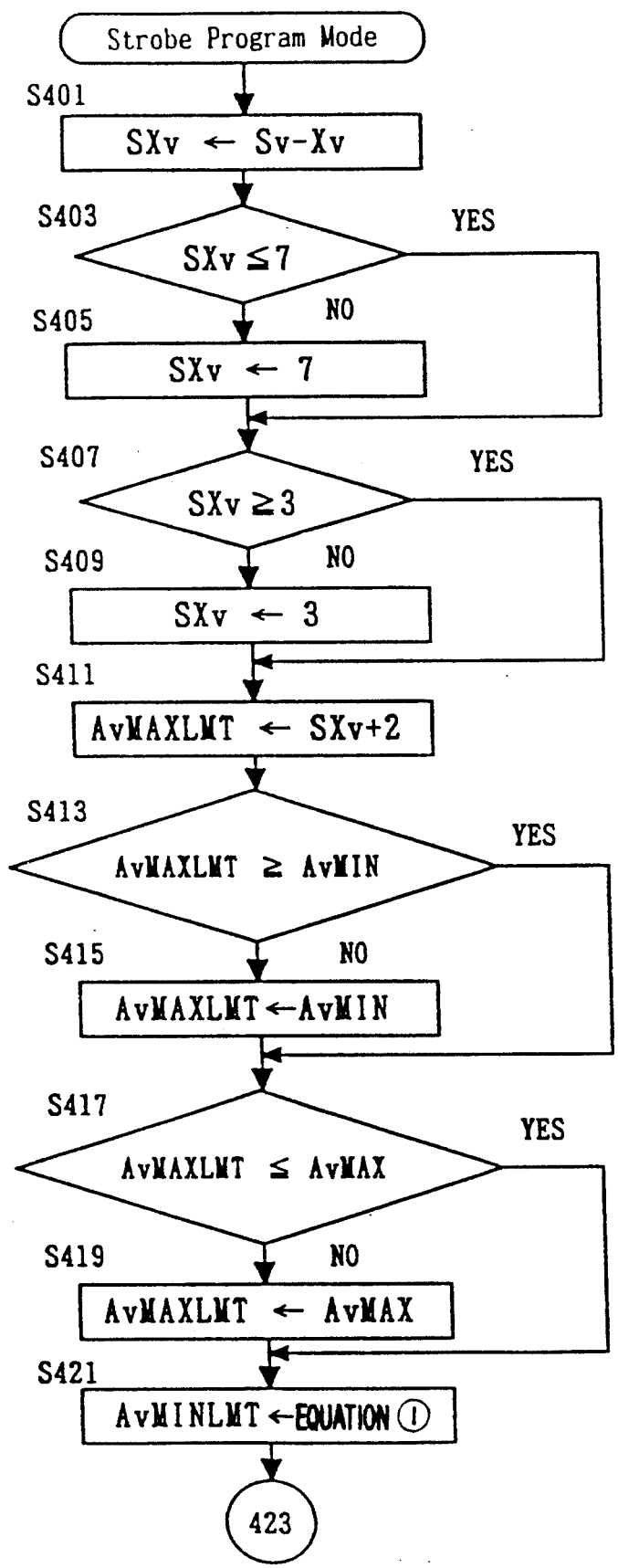
FIGS. 6, 7 and 8 show a flow chart of a strobe program operation in the single lens reflex camera shown in FIG. 1.
Figure 7:
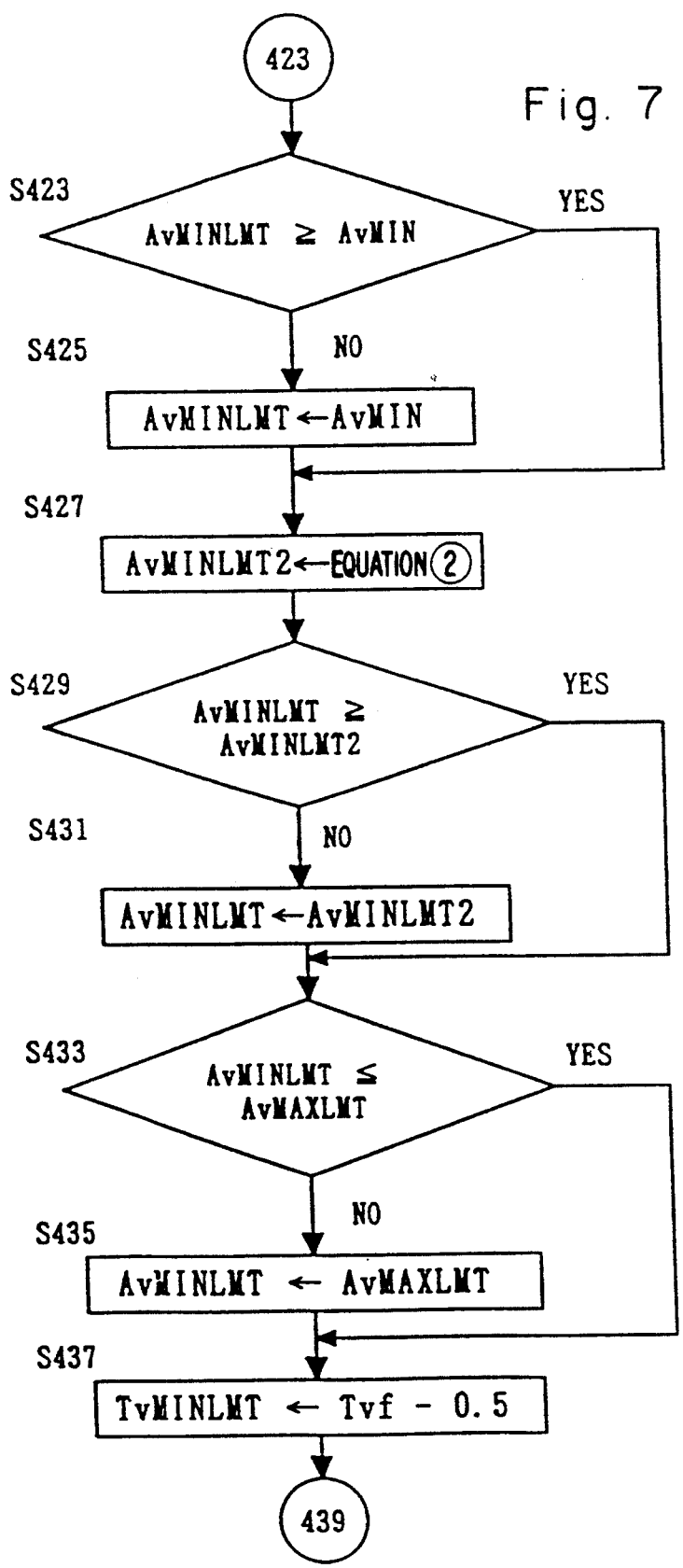
Figure 8:
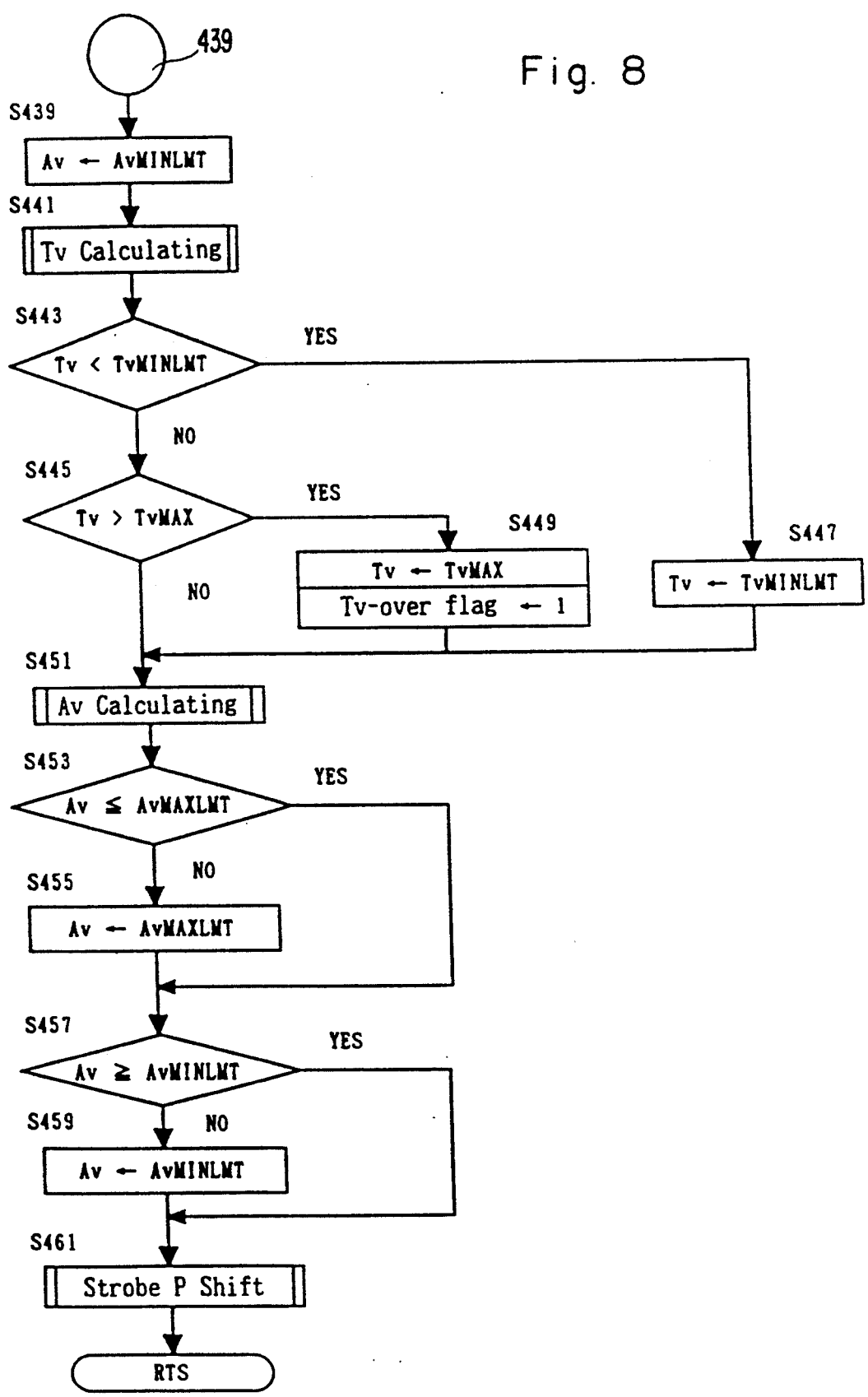

Strobe Program Exposure Calculation Operation:

FIG. 6 shows a flow chart of a strobe program exposure operation called at step S219 in the sub-routine shown in FIG. 3. In the strobe program of the illustrated embodiment, the minimum limit shutter speed TvMINLMT is set in accordance with the focal length of the photographing lens (i.e., taking lens), and the maximum limit diaphragm value AvMAXLMT and the minimum limit diaphragm value AvMINLMT are set in accordance with the film sensitivity Sv. Also, the minimum limit diaphragm value AvMINLMT is varied in accordance with the object distance.

The shutter speed Tv and the diaphragm value Av are determined in accordance with the maximum limit diaphragm value AvMAXLMT, the minimum limit diaphragm value AvMINLMT, the minimum limit shutter speed TvMINLMT, and the maximum limit shutter speed TvMAX (i.e., strobe synchronization limit speed). If the program shift is carried out, the controllable ranges are extended to the maximum diaphragm value AvMAX, the minimum diaphragm value AvMIN, the minimum shutter speed TvMIN and the maximum shutter speed TvMax, of the taking lens.

Figure 12A:
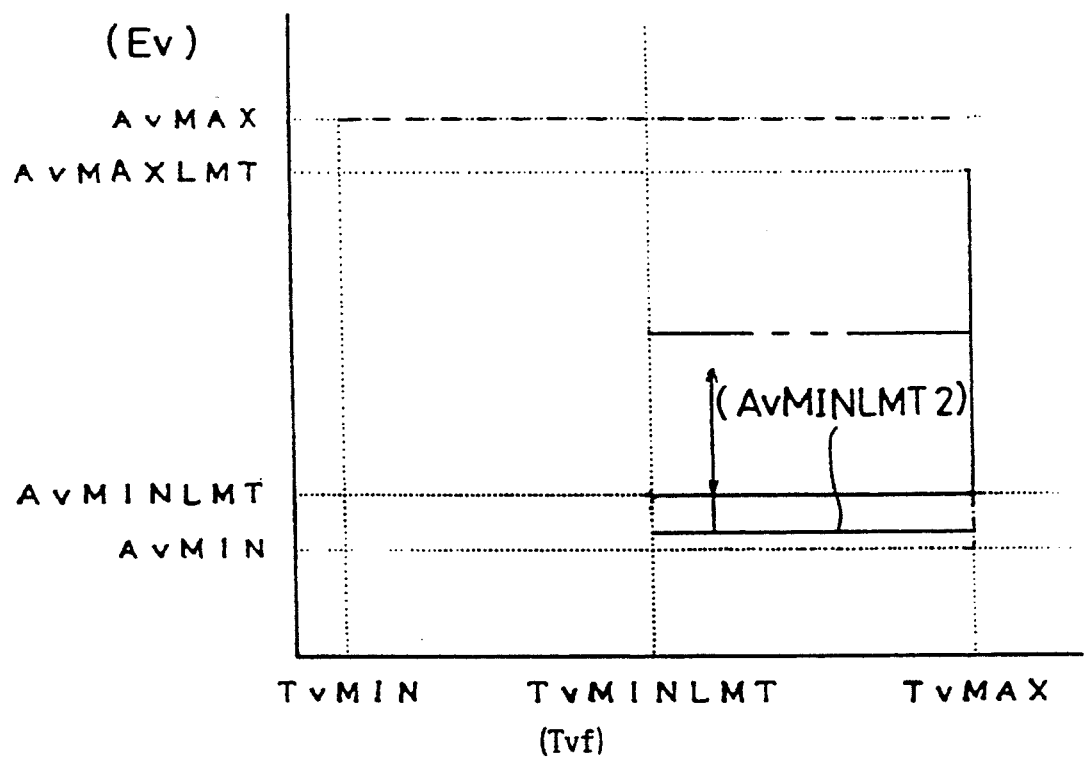
Figure 12B:
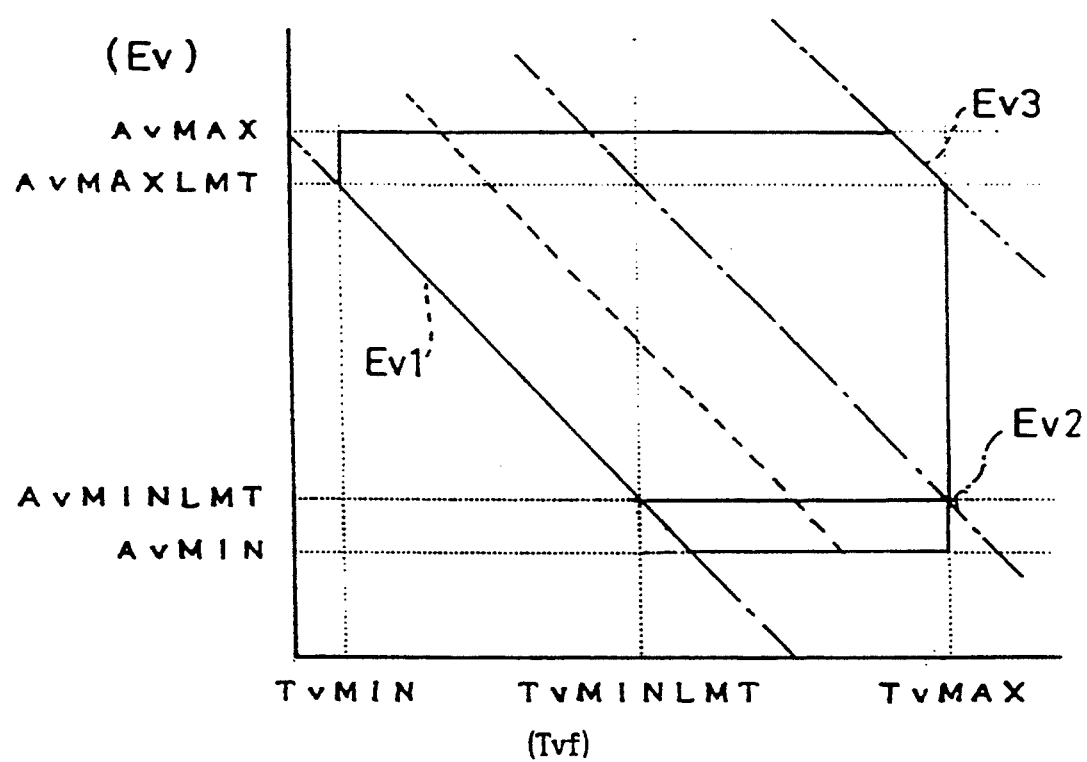
Figure 12C:
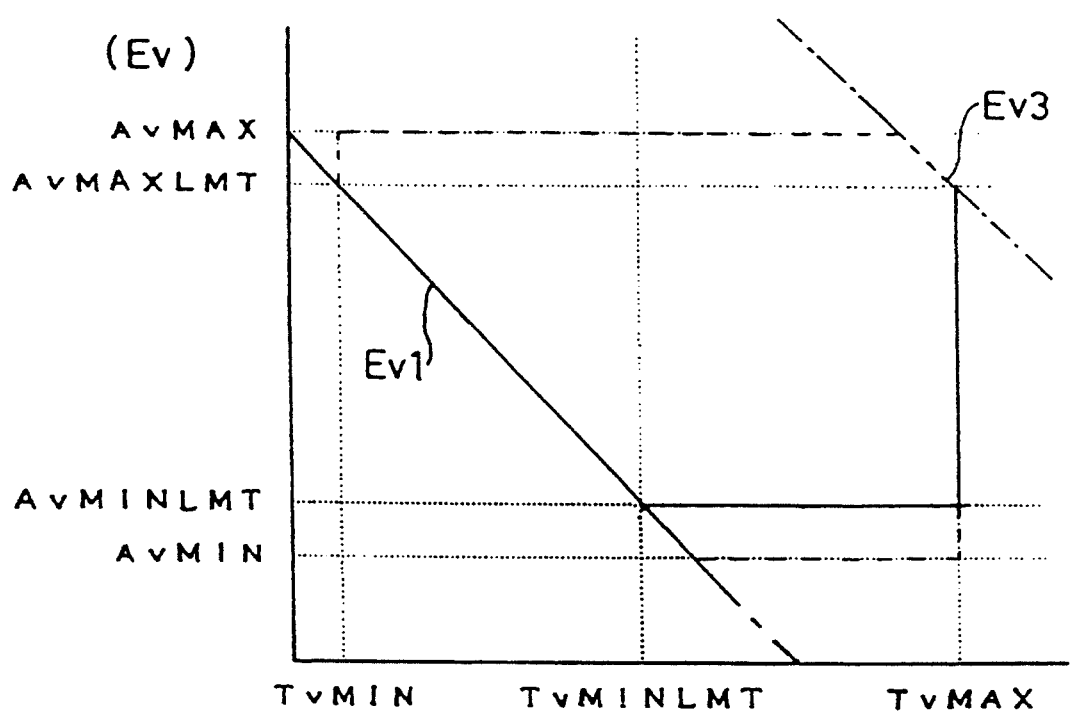

FIGS. 12A, 12B and 12C show examples of the program diagrams obtained by the strobe program operation shown in FIG. 6. In FIGS. 12A through 12C, exposure value Ev1, which is determined by the minimum limit diaphragm value AvMINLMT and the minimum limit shutter speed TvMINLMT, is lower limit of the exposure value; the exposure value Ev2, which is determined by the minimum limit diaphragm value AvMINLMT and the maximum shutter speed TvMAX, is the second exposure value; and, exposure value Ev3, which is determined by the maximum shutter speed TvMAX and the maximum limit diaphragm value AvMAXLMT, is the upper limit of the exposure value.

In the strobe program operation, an adjusted film sensitivity SXv is obtained by subtracting an exposure correcting value Xv from the film sensitivity Sv at step S401. Thereafter, the adjusted film sensitivity SXv is limited to a range of 3 (corresponding to ISO 25) to 7 (corresponding to ISO 400) at steps S403 through S409. The reason for this operation is that, if the adjusted sensitivity SXv is above 7 (ISO 400), the maximum limit diaphragm value AvMAXLMT (=SXv+2) will be beyond the upper limit of the practicable range (i.e., controllable range). Conversely, if the adjusted sensitivity SXv is below 3 (ISO 25), the maximum limit diaphragm value AvMAXLMT (=SXv+2) will be below the lower limit of the practicable range (i.e., controllable range).

Thereafter, the maximum limit diaphragm value AvMAXLMT is obtained by the following equation, using the adjusted film sensitivity SXv (step S411);

$$AvMAXLMT = SXv + 2$$

Whether the maximum limit diaphragm value AvMAXLMT is greater than the minimum diaphragm value AvMIN is checked at step S413. If the maximum limit diaphragm value AvMAXLMT is above the minimum diaphragm value AvMIN, the maximum limit diaphragm value AvMAXLMT is not changed. Conversely, if the maximum limit diaphragm value AvMAXLMT is not above the minimum diaphragm value AvMIN, the maximum limit diaphragm value AvMAXLMT is replaced with the controllable minimum diaphragm value AvMIN (step S415).

Thereafter, whether the maximum limit diaphragm value AvMAXLMT is below the maximum diaphragm value AvMAX is checked (step S417). If the maximum limit diaphragm value AvMAXLMT is below the maximum diaphragm value AvMAX, the maximum limit diaphragm value AvMAXLMT is not changed. Conversely, if the maximum limit diaphragm value AvMAXLMT is not below the maximum diaphragm value AvMAX, the maximum limit diaphragm value AvMAXLMT is replaced with the controllable maximum diaphragm value AvMAN (step S419).

Thereafter, the first minimum limit diaphragm value AvMINLMT in the strobe photographing mode is calculated by the following equation (1), at step S421;

$$AvMINLMT = (5 - AvMIN)/2 + (Sv - 5)/2 + AvMIN \quad (1)$$

Equation (1) indicates that, in the case of film having a high sensitivity, the film sensitivity Sv is weighted with an appropriate weight value (e.g., ½) above 0 but below 1, so that the degree (amount) of stop-down is reduced corresponding to the film sensitivity Sv to thereby make it possible to take a picture of an object located at a farther distance at an optimum exposure value.

For instance, if the open diaphragm value of the zoom lens 2 is F4 (AvMIN=4), when the film sensitivity is ISO 100 (Sv=5) the AvMINLMT is equal to 4½, and when the film sensitivity is ISO 400 (Sv=7), the AvMINLMT is equal to 5½, respectively. Note that a value (solution) of "(5−AvMIN)/2+(Sv−5)/2" in equation (1) is usually greater than 0.

There is a possibility that the minimum limit diaphragm value AvMINLMT is smaller than the minimum diaphragm value AvMIN. Accordingly, whether the minimum limit diaphragm value AvMINLMT is less than the minimum diaphragm value AvMIN is checked at step S423. If the minimum limit diaphragm value AvMINLMT is less than the minimum diaphragm value AvMIN, the minimum limit diaphragm value AvMINLMT is set at the minimum diaphragm value AvMIN at step S425.

In the case of a close object distance, the minimum limit diaphragm value AvMINLMT should be varied in accordance with the object distance Dr, so that a picture of the close object can also be taken at an optimum exposure value using the strobe. To this end, the second minimum limit diaphragm value AvMINLMT2 is obtained by the following equation (2) at step S427;

$$AvMINLMT2 = 5 - Dv + (Sv - 3)/ \quad (2)$$

Equation (2) indicates that, in the case of a close object, the film sensitivity Sv is weighted with an appropriate weight value (e.g., ½) above 0 but below 1, so that the degree (amount) of the stop-down is adjusted in accordance with the object distance Dv.

Thereafter, the second minimum limit diaphragm value AvMINLMT2 thus obtained is compared with the first limit diaphragm value AvMINLMT at step S429, so that the larger value can be used as the fixed diaphragm value (minimum limit diaphragm value AvMINLMT). Namely, if the second minimum limit diaphragm value AvMINLMT2 is greater than the first limit diaphragm value AvMINLMT, the minimum limit diaphragm value AvMINLMT is set to be the second minimum limit diaphragm value AvMINLMT2 (step S431) . When the second minimum limit diaphragm value AvMINLMT2 is greater than the first limit diaphragm value AvMINLMT, the object distance is usually very small. Accordingly, the second minimum limit diaphragm value AvMINLMT2, which increases as the object distance decreases, is used as the minimum limit diaphragm value AvMINLMT.

For instance, if the open aperture (diaphragm value) of the zoom lens 2 is F4 (AvMIN=4) and the film sensitivity is ISO 100 (Sv=5), when the object distance D is 1 m (Dv=0), the second minimum limit diaphragm value AvMINLMT2 is 6 (AvMINLMT2=6) which is larger than the calculated minimum limit diaphragm value AvMINLMT which is 4½ (AvMINLMT:4½). Consequently, the minimum limit diaphragm value AvMINLMT is set at AvMINLMT2 which is equal to 6, so that the diaphragm is stopped-down by two steps. Thus, the program diagram as shown in FIG. 12A is obtained.

Thereafter, the minimum limit diaphragm value AvMINLMT is compared with the maximum limit diaphragm value AvMAXLMT at step S433. I f the minimum limit diaphragm value AvMINLMT is greater than the maximum limit diaphragm value AvMAXLMT, the minimum limit diaphragm value AvMINLMT is replaced with the maximum limit diaphragm value AvMAXLMT2 (step S435).

After the limit diaphragm values AvMINLMT and AvMAXLMT are obtained, the control shutter speed Tv is calculated. First, the minimum limit shutter speed TvMINLMT is set at the camera-shake limit shutter speed Tvf from which 0.5 Tv is subtracted at step S437. Thereafter, the diaphragm value Av is set at the minimum limit diaphragm value AvMINLMT. Then, a Tv calculation sub-routine is called to calculate the shutter speed Tv in accordance with the diaphragm value Av (steps S439 and S441).

Thereafter, the limit operation is carried out to restrict the control shutter speed Tv between the minimum limit shutter speed TvMINLMT and the maximum shutter speed TvMAX (i.e., synchronization shutter speed Tv) at steps S443 through S449. Namely, if the control shutter speed Tv is less than the minimum limit shutter speed TvMINLMT, the control shutter speed Tv is set at the minimum limit shutter speed TvMINLMT (steps S443, S447). Conversely, if the control shutter speed Tv is greater than the maximum shutter speed TvMAX, the control shutter speed Tv is set at the maximum shutter speed TvMAX, and a Tv-over flag is set to "1" to indicate that the optimum shutter speed Tv is a large value (steps S443, S445 and S449).

Thereafter, an Av calculation sub-routine (FIG. 11) is called to calculate the control diaphragm value Av in accordance with the control shutter speed Tv, which is then subject to the limit operation to restrict the same between the maximum limit diaphragm value AvMAXLMT and the minimum limit diaphragm value AvMINLMT (steps S453 through S459). Namely, if the control diaphragm value Av is greater than the maximum limit diaphragm value AvMAXLMT, the control diaphragm value Av is set at the maximum limit diaphragm value AvMAXLMT (steps S453, S455). Conversely, if the control diaphragm value Av is less than the minimum limit diaphragm value AvMINLMT, the control diaphragm value Av is set at the minimum diaphragm value AvMINLMT (steps S457,. S459).

When the control shutter speed Tv and the control diaphragm value Av are set, the strobe program shift sub-routine (FIG. 9) is called to effect the shift operation of the control shutter speed Tv and the control diaphragm value Av. Thereafter, control is returned (step S461).

Figure 10:
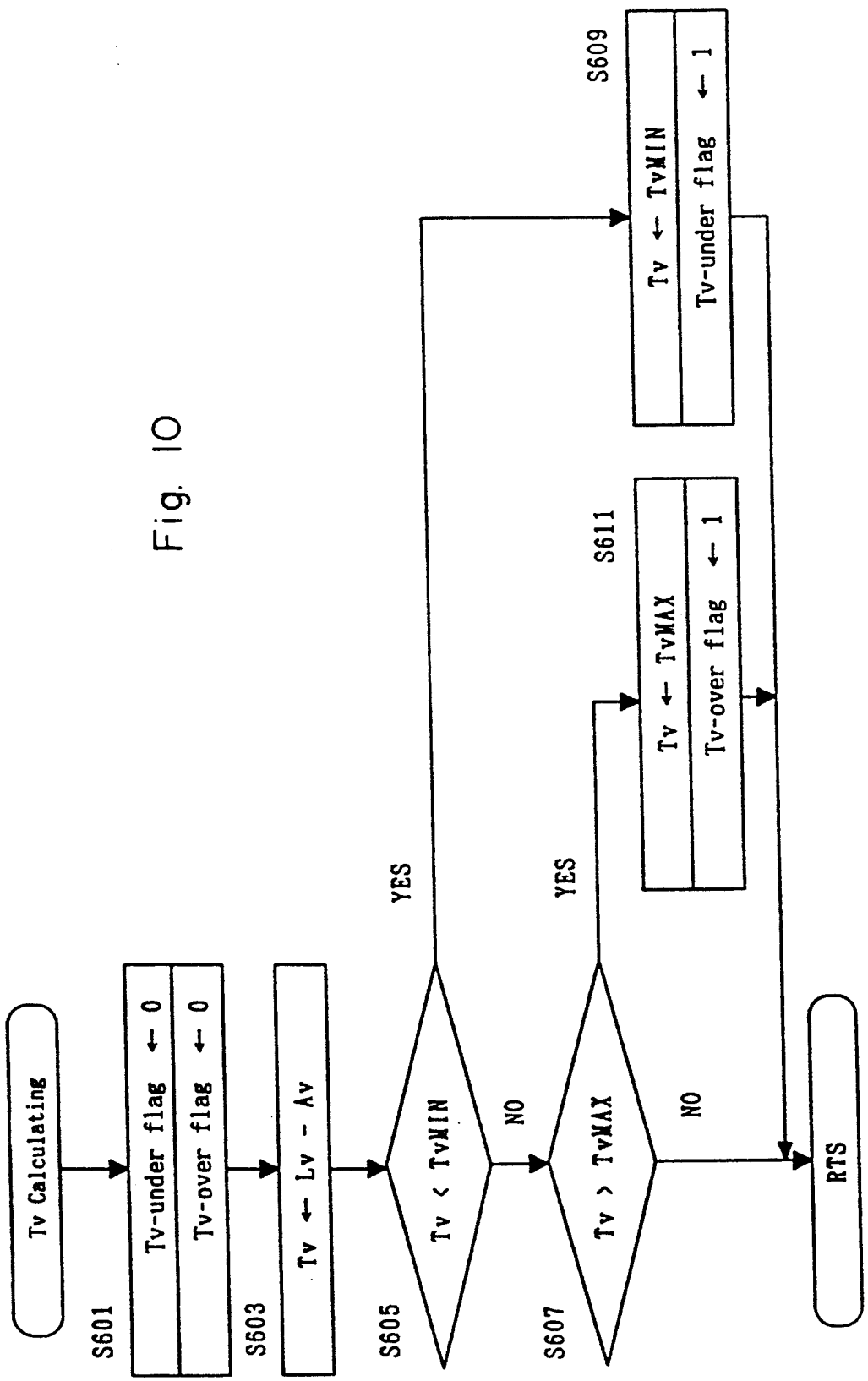
FIG. 10 is a flow chart of a shutter speed limiting operation in the single lens reflex camera shown in FIG. 1.
Figure 11:
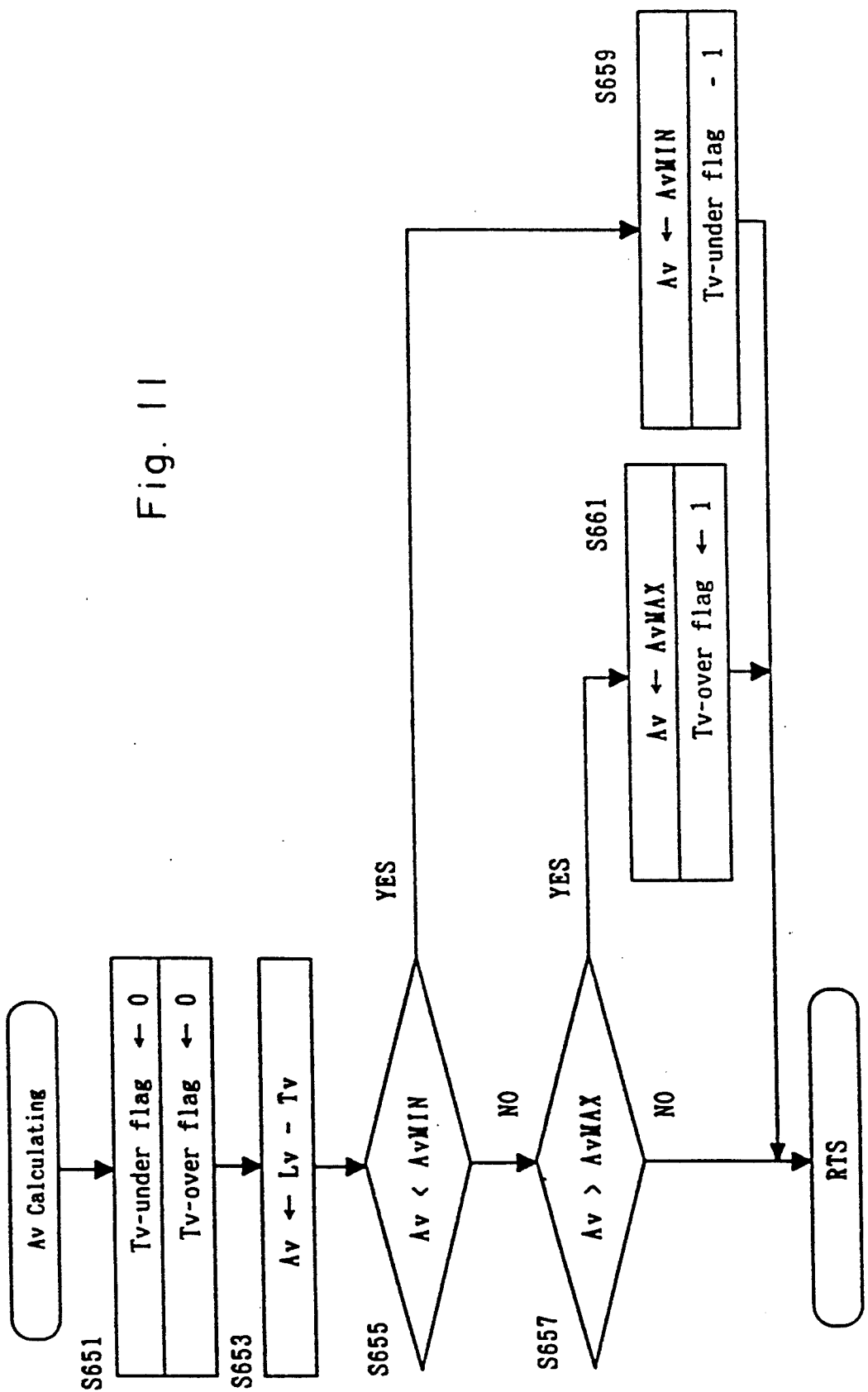
FIG. 11 is a flow chart of a diaphragm value limiting operation in the single lens reflex camera shown in FIG. 1; and, FIGS. 12A, 12B and 12C are program diagrams which illustrate strobe program lines and program shifts in the single lens reflex camera shown in FIG. 1.

Tv, Av Calculating Operation:

The calculation of Tv and Av to restrict the same will be discussed below with reference to FIGS. 10 and 11.

In a calculation of Tv, the Tv-under flag and the Tv-over flag are both set at "0". Thereafter, the optimum control shutter speed Tv is obtained, based on the exposure value Lv and the control diaphragm value Av (steps S601, S603). Then, it is determined whether the optimum control shutter speed Tv thus obtained is between the minimum shutter speed TvMIN and the maximum shutter speed TvMAX (steps S605 and S607). If the optimum control shutter speed Tv is between the minimum shutter speed TvMIN and the maximum shutter speed TvMAX, control is returned.

If the optimum control shutter speed Tv is smaller than the minimum shutter speed TvMIN, the optimum control shutter speed Tv is set at the minimum shutter speed TvMIN, and the Tv-under flag is set to "1" to indicate that the optimum control shutter speed Tv is smaller than the minimum shutter speed TvMIN (steps S605 and S609). If the optimum control shutter speed Tv is greater than the maximum shutter speed TvMAX, the optimum control shutter speed Tv is replaced with the maximum shutter speed TvMAX, and the Tv-over flag is set to "1" to indicate that the optimum control shutter speed Tv is greater than the maximum Shutter speed TvMAX (steps S605, S607 and S611).

Similar to the calculation of Tv, in the calculation of Av, the Av-under flag and the AV-over flag are both set to "0". Thereafter, the optimum control diaphragm value Av is obtained, based on the exposure value Lv and the control shutter speed Tv (steps S651, S653). Thereafter, it is determined whether the optimum control diaphragm value Av thus obtained is between the minimum diaphragm value AvMIN and the maximum diaphragm value AvMAX is checked (steps S655 and S657). If the optimum control diaphragm value Av is between the minimum diaphragm value AvMIN and the maximum diaphragm value AvMAX, control is returned.

If the optimum control diaphragm value Av is smaller than the minimum diaphragm value AvMIN, the optimum control diaphragm value Av is set at the minimum diaphragm value AvMIN, and the Av-under flag is set to "1" to indicate that the optimum control diaphragm value Av is less than the minimum diaphragm value AvMIN (steps S655 and S659). If the optimum control diaphragm value Av is greater than the maximum diaphragm value AvMAX, the optimum control diaphragm value Av is replaced with the maximum diaphragm value AvMAX, and the Av-over flag is set to "1" to indicate that the optimum control diaphragm value Av is greater than the maximum diaphragm value AvMAX (steps S655, S657 and S661).

The control shutter speed Tv and the control diaphragm value Av thus adjusted can be practically controlled by the camera body 1 and the zoom lens 2.

Strobe P Shift Operation:

The following discussion will be addressed to the strobe program (P) shift operation, with reference to FIG. 9 and FIGS. 12B and 12C.

According to a significant feature of the present invention, the strobe P shift is effected in a wide range defined by the solid lines in the program diagrams shown in FIGS. 12B and 12C. Note that the flow chart shown in FIG. 9 is called at step S461 in the strobe program sub-routine, mentioned above.

In the flow chart shown in FIG. 9, first it is determined whether the amount of program shift is 0 at step S501. If the program shift amount is 0, control is returned. Conversely, if the program shift amount is not 0, the following operations are carried out.

The exposure value Lv obtained in the photometering and calculating operation shown in FIG. 3 is set in an Lv memory. Thereafter, the exposure value Lv is replaced with the sum of the control shutter speed Tv and the control diaphragm value Av obtained in the strobe program operation mentioned above (steps S503 and S505).

Consequently, if the exposure value Lv obtained in the photometering and calculating operation is less than the lower limit exposure value Ev1, the combination of the control shutter speed Tv and the control diaphragm value Av can be shifted along the lower limit exposure value Ev1 indicated by the solid line shown in FIGS. 12B and 12C. Conversely, if the exposure value Lv is greater than the lower limit exposure value Ev1 and less than the upper limit exposure value Ev3, the combination of the control shutter speed Tv and the control diaphragm value Av can be shifted along the line of the exposure value Ev, depending on the object brightness. Moreover, if the exposure value Lv is greater than the upper limit exposure value Ev3, the combination of the control shutter speed Tv and the control diaphragm value Av can be shifted along the line of the upper limit exposure value Ev3.

At step S507, the program shift direction bit is checked. If the program shift direction bit is "0" (i.e., positive), the amount of the program shift is added to the control shutter speed Tv. If the control shutter speed Tv plus the program shift amount is greater than the maximum shutter speed TvMAX, the maximum shutter speed TvMAX is set as the control shutter speed Tv (steps S507, S509 to S513).

If the program shift direction bit is "1" (i.e., negative) at step S507, the amount of the program shift is subtracted from the control shutter speed Tv. If the control shutter speed Tv minus the program shift amount is less than the minimum shutter speed TvMIN, the minimum shutter speed TvMIN is set as the control shutter speed Tv (steps S507, S515 to S519).

Thereafter, based on the control shutter speed Tv thus obtained, the Av calculation sub-routine is called to obtain the control diaphragm value Av which can be controlled (step S521). Whether the control diaphragm value Av is an optimum value is checked (steps S523 and S525). If the Av-over flag or Av-under flag is set to "1", the control diaphragm value Av obtained at step S521 is not an optimum value. Thus, the Tv calculation sub-routine is called to again calculate the optimum shutter speed Tv corresponding to the control diaphragm value Av (steps S523 and S527 or S523 and S527).

When the above-mentioned operations are completed, control proceeds to step S529 to replace the exposure value Lv which has been set in the Lv memory at step S503 with the exposure value Lv. Control is then returned.

As can be seen from the new above discussion, in the strobe photographing mode, even if the exposure value Lv is less than the value which is determined by the minimum limit diaphragm value AvMINLMT and the minimum limit shutter speed TvMINLMT, the diaphragm value Av is shiftable between the minimum diaphragm value AvMIN and the maximum diaphragm value AvMAX, and the shutter speed Tv is shiftable between the minimum shutter speed TvMIN and the synchronization maximum shutter speed TvMAX, as indicated by the phantom lines in the program diagrams shown in FIGS. 12B and 12C. Thus, the shutter speed and the diaphragm value are shiftable within the range defined by the phantom lines.

In the strobe program, in a single lens reflex camera, according to the present invention, since the minimum limit diaphragm value is set in accordance with the film sensitivity Sv, which is weighted with a predetermined weight value above 0 and below 1 (e.g., ½), if a film having a high sensitivity is used, an object at a farther distance can be photographed at an optimum exposure value. On the other hand, for an object at a close object distance, the diaphragm value is modified to increase the stopping-down operation as the object distance D decreases. Accordingly, a close object can also be photographed at an optimum exposure value.

Furthermore, since the program shift can be effected even in the strobe photographing mode, the shutter speed Tv and the diaphragm value Av in combination can be set in ha wide range so as to meet an extended photographing condition and photographer's intention.

Although the illustrated embodiment is applied to a single lens reflex camera which is provided with the external strobe 3 being detachably attached to the camera body, the present invention can be applied to a camera having a built-in strobe. Furthermore, the application of the present invention is not limited to a single lens reflex camera.

As can be understood from the above discussion, according to the present invention, in the strobe photographing mode, the first minimum limit diaphragm value is set in accordance with the film sensitivity which is weighted with a predetermined weight value above 0 and below 1. Accordingly, if a film of high sensitivity is used, an object at a farther object distance can be taken at an optimum exposure value. On the other hand, for an object at a close object distance, since the second minimum limit diaphragm value is set such that the diaphragm value increases as the object distance decreases, using the above-mentioned equation (2), a close object can be also photographed at an optimum exposure value.

Moreover, since the exposure control apparatus according to the present invention includes a program shift means which modifies the shutter speed and the diaphragm value within the range defined by the minimum shutter speed, the strobe synchronization limit speed, the minimum diaphragm value and the maximum diaphragm value, without changing the calculated exposure value, when the calculated exposure value is greater than the lower limit exposure value which is determined by the minimum limit diaphragm value and the minimum limit shutter speed and less than the upper limit exposure value which is determined by the maximum limit diaphragm value and the strobe synchronization limit speed, respectively, the combination of the shutter speed and the diaphragm value can be modified within a wider range, while retaining the optimum exposure value at the strobe photographing mode.

Furthermore, according to the present invention, in the strobe photographing mode, when the calculated exposure value depending on the object brightness is below the lower limit exposure value, which is determined by the minimum limit diaphragm value greater than the minimum diaphragm value of the taking lens, and the minimum limit shutter speed is smaller than the strobe synchronization limit shutter speed, the calculated exposure value is replaced with the lower limit exposure value, and the shutter speed and the diaphragm value are modified while maintaining the lower limit exposure value.

On the other hand, when the calculated exposure value is above the upper limit exposure value, which is determined by the maximum limit diaphragm value less than maximum diaphragm value of the taking lens and the strobe synchronization limit speed, the calculated exposure value is replaced with the upper limit exposure value, and the shutter speed and the diaphragm value are modified while maintaining the upper limit exposure value.

Consequently, the program shift can be effected within the shutter speed and diaphragm value that can be controlled by the camera even in the strobe photographing mode, so that a wide range of combined shutter speeds and diaphragm values can be obtained.

We claim:

1. An exposure control apparatus of a camera having a photometering means, a film sensitivity setting means, an object distance detecting means, a strobe light emitting means, and a calculating means, wherein said calculating means calculates an exposure value, a diaphragm value and a shutter speed in accordance with a photometering measurement made by said photometering means and a film sensitivity set by said film sensitivity setting means, comprising:

limit diaphragm value calculating means for calculating a first limit diaphragm value and a second limit diaphragm value when a strobe light is to be emitted from said strobe light emitting means, wherein said first limit diaphragm value varies with a film sensitivity and wherein said second limit diaphragm value varies with an object distance detected by said object distance detecting means; and minimum limit diaphragm value setting means for comparing said first and second limit diaphragm values and setting the larger diaphragm value as said minimum limit diaphragm value to be used to control an exposure.

2. An exposure control apparatus according to claim 1, wherein said film sensitivity is weighted with a predetermined value between zero and one.

3. An exposure control apparatus according to claim 2, wherein said first limit diaphragm value is based on a first equation in which said diaphragm value increases as said film sensitivity increases, and wherein said second limit diaphragm value is based on a second equation in which said diaphragm value increases as said object distance decreases.

4. An exposure control apparatus according to claim 3, further including a strobe program mode in which a controllable range of said shutter speed is defined by a strobe synchronization limit speed and a minimum limit shutter speed when said strobe light is emitted.

5. An exposure control apparatus according to claim 4 wherein in said strobe program mode said diaphragm value is fixed to said minimum limit diaphragm value which is greater than a minimum diaphragm value of an associated taking lens, and said shutter speed is modified within said controllable range.

6. An exposure control apparatus according to claim 3, wherein said first equation is given by:

$$(5 - AvMIN)/2 + (Sv - 5)/2 + AvMIN$$

and said second equation is given by:

$$5 - Dv + (Sv - 3)/'$$

wherein:
AvMIN = apex value of an open aperture of said taking lens,
Sv = apex value of said film sensitivity,
D = object distance (m), and
Dv = log(D)²/log2.

7. An exposure control apparatus according to claim 6, wherein said minimum limit shutter speed is substantially identical to a camera-shake limit shutter speed.

8. An exposure control apparatus according to claim 7, wherein said camera-shake limit shutter speed is given by:

$$Tvf = (1) \times fv + 2$$

wherein;
f = focal length (mm) of the taking lens
fv = logf/log2.

9. An exposure control apparatus according to claim 1, wherein said exposure control apparatus is incorporated in a camera body to which a taking lens can be detachably attached.

10. An exposure control apparatus according to claim 9, wherein said taking lens comprises means for detecting a current object distance and a memory in which said minimum diaphragm value and a maximum diaphragm value of said taking lens are stored.

11. An exposure control apparatus according to claim 10, wherein said camera body comprises input means for inputting object distance data supplied by said object distance detecting means and said minimum and maximum diaphragm values supplied from said memory.

12. An exposure control apparatus of a camera having a photometering means, a strobe light emitting means, and means for calculating an exposure value, a diaphragm value and a shutter speed in accordance with a measurement by said photometering means, comprising:

a strobe program mode in which said shutter speed is set within a range defined by a strobe synchronization limit speed and a minimum limit shutter speed, which is less than said strobe synchronization limit speed, in accordance with said exposure value when strobe light is emitted from said strobe light emitting means, said diaphragm value being set within a range defined by a minimum limit diaphragm value which is grater than a minimum diaphragm value of an associated taking lens and a maximum limit diaphragm value which is less than a maximum diaphragm value of said taking lens; and program shift means for varying said shutter speed within a range defined by said minimum shutter speed and said strobe synchronization limit speed, and for varying said diaphragm value within a range defined by said minimum diaphragm value and said maximum diaphragm value, without changing said exposure value calculated by said calculating means, in said strobe program mode, when said calculated exposure value is above a lower limit exposure value determined according to said minimum limit diaphragm value and said strobe synchronization limit speed, and below an upper limit exposure value determined according to said maximum limit diaphragm value and said strobe synchronization limit speed.

13. An exposure control apparatus according to claim 12, wherein in said strobe program mode, said diaphragm value is fixed to said minimum limit diaphragm value and said shutter speed is varied in accordance with said exposure value calculated by said calculating means, when said exposure value is above said lower limit exposure value and above a second exposure value determined according to said minimum limit diaphragm value and said strobe synchronization limit speed.

14. An exposure control apparatus according to claim 13, wherein when said exposure value is above said second exposure value and below said upper limit exposure value, said shutter speed is fixed to said strobe synchronization limit speed and said diaphragm value is varied in accordance with said calculated exposure value.

15. An exposure control apparatus of a camera having a photometering means, a strobe light emitting means, a strobe program mode, and means for calculating an exposure value, a diaphragm value and a shutter speed in accordance with a measurement by said photometering means, comprising:

means for replacing said exposure value calculated by said calculating means with a lower limit exposure value determined by a minimum limit diaphragm value which is greater than a minimum diaphragm value of an associated taking lens and a minimum limit shutter speed which is less than a strobe synchronization limit speed, in said strobe program mode, when said calculated exposure value is less than said lower limit exposure value; and program shift means for varying said shutter speed and said diaphragm value, while retaining said lower limit exposure value, in said strobe program mode, when said replacing means replaces said calculated exposure means with said lower limit exposure value.

16. An exposure control apparatus according to claim 15, wherein said minimum limit shutter speed is substantially identical to a camera-shake limit shutter speed.

17. An exposure control apparatus of a camera having a photometering means, a strobe program mode, and means for calculating an exposure value in accordance with measurement by said photometering means, comprising:

means for replacing said exposure value calculated by said calculating means with an upper limit exposure value determined by a maximum limit diaphragm value which is less than a maximum diaphragm value of an associated taking lens, and a strobe synchronization limit speed, in said strobe program mode, when said calculated exposure value is greater than said upper limit exposure value; and program shift means for a varying a shutter speed and a diaphragm value, while maintaining said upper limit exposure value, in said strobe program mode.

* * * * *

UNITED STATES PATENT AND TRADEMARK OFFICE
CERTIFICATE OF CORRECTION

PATENT NO. : 5,325,147
DATED : June 28, 1994
INVENTOR(S) : T. KIRIGAYA et al.

It is certified that error appears in the above-indentified patent and that said Letters Patent is hereby corrected as shown below:

At column 15, line 46 (claim 5, line 2), after "4" insert ---,---.

At column 15, line 58 (claim 6, line 5), change"3)/'"  ---3)/2---.

At column 18, line 20 (claim 17, line 14), change "a varying" to ---varying---.

Signed and Sealed this

Eighteenth Day of July, 1995

Attest:

BRUCE LEHMAN

Attesting Officer        Commissioner of Patents and Trademarks